(12) United States Patent
Basu et al.

(10) Patent No.: US 10,078,588 B2
(45) Date of Patent: Sep. 18, 2018

(54) USING LEASES FOR ENTRIES IN A TRANSLATION LOOKASIDE BUFFER

(71) Applicant: Advanced Micro Devices, Inc., Sunnyvale, CA (US)

(72) Inventors: Arkaprava Basu, Austin, TX (US); Mark H. Oskin, Bellevue, WA (US); Gabriel H. Loh, Bellevue, WA (US); Andrew G. Kegel, Bellevue, WA (US); David S. Christie, Austin, TX (US); Kevin J. McGrath, Sunnyvale, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 161 days.

(21) Appl. No.: 15/081,379

(22) Filed: Mar. 25, 2016

(65) Prior Publication Data
US 2017/0277634 A1    Sep. 28, 2017

(51) Int. Cl.
*G06F 12/08* (2016.01)
*G06F 12/0808* (2016.01)
(Continued)

(52) U.S. Cl.
CPC ........ *G06F 12/0808* (2013.01); *G06F 12/084* (2013.01); *G06F 12/0811* (2013.01); *G06F 12/0842* (2013.01); *G06F 12/0891* (2013.01); *G06F 12/1027* (2013.01); *G06F 2212/657* (2013.01); *G06F 2212/683* (2013.01)

(58) Field of Classification Search
None
See application file for complete search history.

(56) References Cited

U.S. PATENT DOCUMENTS

2005/0114607 A1* 5/2005 Cohen ................. G06F 12/1027
                                                    711/135
2009/0313695 A1    12/2009 Bridges et al.
(Continued)

OTHER PUBLICATIONS

Villavieja, C., "DiDi: Mitigating the Performance Impact of TLB Shootdowns Using a Shared TLB Directory," International Conference on Parallel Architectures and Compilation Techniques (PACT), Oct. 2011.
(Continued)

*Primary Examiner* — Tracy C Chan
(74) *Attorney, Agent, or Firm* — Park, Vaughan, Fleming & Dowler LLP (57) ABSTRACT

The described embodiments include a computing device with two or more translation lookaside buffers (TLB) that performs operations for handling entries in the TLBs. During operation, the computing device maintains lease values for entries in the TLBs, the lease values representing times until leases for the entries expire, wherein a given entry in the TLB is invalid when the associated lease has expired. The computing device uses the lease value to control operations that are allowed to be performed using information from the entries in the TLBs. In addition, the computing device maintains, in a page table, longest lease values for page table entries indicating when corresponding longest leases for entries in TLBs expire. The longest lease values are used to determine when and if a TLB shootdown is to be performed.

20 Claims, 5 Drawing Sheets

(51) Int. Cl.
*G06F 12/0811* (2016.01)
*G06F 12/084* (2016.01)
*G06F 12/0842* (2016.01)
*G06F 12/0891* (2016.01)
*G06F 12/1027* (2016.01)

(56) References Cited

U.S. PATENT DOCUMENTS

| | | | |
|---|---|---|---|
| 2014/0181388 A1* | 6/2014 | Mohandru | G11C 7/1072 |
| | | | 711/105 |
| 2014/0351151 A1* | 11/2014 | Chiu | G06Q 30/0645 |
| | | | 705/307 |
| 2015/0067296 A1* | 3/2015 | Basu | G06F 12/1009 |
| | | | 711/206 |
| 2016/0077761 A1* | 3/2016 | Stabrawa | G06F 3/0604 |
| | | | 711/172 |
| 2017/0109317 A1* | 4/2017 | Hack | G06F 17/00 |

OTHER PUBLICATIONS

Romanescu, B., "UNified Instruction/Translation/Data (UNITD) Coherence: One Protocol to Rule Them All," IEEE International Symposium on High-Performance Computing Architecture (HPCA), Jan. 2010.

* cited by examiner

USING LEASES FOR ENTRIES IN A TRANSLATION LOOKASIDE BUFFER

BACKGROUND

Field

The described embodiments relate to computing devices. More specifically, the described embodiments relate to using leases for entries in a translation lookaside buffer.

Related Art

Many modern computing devices use a virtual memory technique for handling data accesses by programs (e.g., applications, operating systems, device drivers, etc.) being executed in the computing devices. In such a computing device, when data is accessed by a program, a block of memory of a given size (e.g., 4 kB) that includes the data, which is called a "page" of memory, is copied from mass storage (e.g., a disk drive or semiconductor memory) to an available physical location in a main memory in the computing device and/or newly created in the memory (e.g., to store results generated from computational operations, etc.). In order to avoid programs being required to keep track of the physical locations of pages in memory, processors in the computing device keep track of the physical locations of the pages for the programs. In such a computing device, programs access memory using "virtual addresses" in "virtual address spaces," which are local address spaces that are specific to corresponding programs, instead of accessing memory using addresses based on the physical locations of pages (or "physical addresses"). From a program's perspective, virtual addresses indicate the actual physical locations where data is stored within the pages in memory and memory accesses are made by programs using the virtual addresses accordingly. The virtual addresses, however, may not map directly to the physical addresses of the physical locations where data is stored in pages in the memory. As part of managing the physical locations of pages, the processors translate the virtual addresses used by the programs in memory access requests into the physical addresses where the data is actually located. The processors then use the physical addresses to perform the memory accesses for the programs.

In order to enable the above-described virtual address to physical address translation, the computing device includes a "page table." The page table is a record stored in a memory of the computing device that includes an entry, or a "page table entry," with virtual address to physical address translation information for pages of data that are stored in the main memory. Upon receiving a request from a program to access memory at a given virtual address, a processor acquires corresponding physical address information from the page table by performing a "page table walk," during which the page table is searched, possibly entry-by-entry, for a page table entry that provides the physical address associated with the virtual address.

Because the above-described page table walks are relatively slow, it is desirable to avoid performing page table walks. The computing device therefore includes translation lookaside buffers ("TLBs"), which are local caches in each processor that are used by the processor for storing a limited number of copies of page table entries acquired during page table walks (or information based on page table entries). During operation, processors first attempt to acquire cached page table entries from the corresponding TLB for performing virtual address to physical address translations. When the copy of the corresponding page table entry is not present in the TLB (i.e., when a "miss" occurs), the processors perform a page table walk to acquire the desired page table entry—and cache a copy of the acquired page table entry in the TLB.

During operation, processors in the above-described computing devices may modify page table entries in the page table (e.g., change virtual address to physical address translation information for the page table entries, change a read/write property for page table entries, etc.). In order to avoid inconsistencies between the page table and copies of page table entries held in TLBs in other processors in the computing device, a processor that initiated the modification of the page table entry (or an "initiating processor") can perform an operation called a "TLB shootdown." Generally, during a TLB shootdown, a processor that is to modify a page table entry causes other processors that may hold a cached copy of the page table entry to invalidate the cached copy, thereby avoiding the inconsistencies.

When performing a TLB shootdown to enable modifying a page table entry, the initiating processor (e.g., a memory management unit in the initiating processor, an operating system executing on the initiating processor, etc.) modifies the page table entry. The initiating processor also determines other processors that may have copies of the information from the page table entry cached in their TLBs, and sends the other processors an inter-process interrupt (IPI) that indicates the page table entry being modified. Upon receiving the IPI, each of the other processors invalidates an entry in the corresponding TLB containing the page table entry, if such an entry exists in the corresponding TLB. Each other processor also returns, to the initiating processor, an acknowledgement. The initiating processor collects the acknowledgements and, when an acknowledgement has been received from each of the other processors proceeds with subsequent operations. During these operations, the processor may switch between kernel-mode and user-mode.

Because the above-described operations for performing a TLB shootdown are long latency, performing the TLB shootdown typically requires a significant amount of time to complete (e.g., tens of thousands of cycles of a clock in the processor). Compounding this problem, the latency of these operations increases as the number of processors in the computing device increases. For example, when central processing units (CPUs) and graphics processing units (GPUs) share an address space in a computing device, both the CPUs and the GPUs must participate in TLB shootdowns.

BRIEF DESCRIPTION OF THE FIGURES

Throughout the figures and the description, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Overview

The described embodiments include a separate translation lookaside buffer (TLB) in each of two or more processor cores in a processor. Each of the TLBs has a number of entries, each entry configured to be used for storing (i.e., caching) information based on a page table entry (e.g., a virtual address to physical address translation and corresponding metadata). In the described embodiments, the processor can perform the above-described TLB shootdowns when modifying page table entries in a page table. Because TLB shootdowns are relatively slow, however, the described embodiments use lease values and latest lease values to avoid, when possible, performing the TLB shootdowns.

In the described embodiments, a lease value is associated with each entry in the TLBs that contains information based on a page table entry. For example, the lease value may be stored in metadata associated with the entry in the TLB or stored in a separate location. The lease value for each entry represents a time for which the entry is valid. For example, a lease value may be a particular absolute or relative time, before which the corresponding entry in the TLB is considered valid. When the lease "expires," the corresponding entry is considered invalid and the page table entry in the entry can no longer be used for specified operations (e.g., virtual address to physical address translations, etc.). For example, when a lease value is a particular time that has passed, the entry is considered invalid and can no longer be used for the specified operations.

In the described embodiments, multiple TLBs in the processor may hold a cached copy of information based on the same page table entry with different lease values, and thus different expiration times. In order to keep track of the latest/last lease expiration time, the described embodiments store a latest lease value for page table entries in the page table. For example, the latest lease value may be stored in metadata associated with the page table entry or stored in a separate location in the memory. The latest lease value for each page table entry holds a value representing the longest lease value for a copy of the information based on the page table entry held in a TLB. For example, if a TLB in a first core holds a copy of information based on the page table entry with a lease value of time X and a TLB in a second core holds a copy of information based on the same page table entry with a lease value of time X+Z, where X and Z are positive values, the latest lease value for the page table entry in the page table is time X+Z. In some embodiments, a latest lease value for a page table entry is set when a first copy of information based on the page table entry is stored in a TLB with a corresponding lease value. When each subsequent copy of information based on the page table entry is stored in a TLB with a corresponding lease value, if the corresponding lease value is longer than the existing latest lease value, the latest lease value for the page table entry can be updated.

The described embodiments use the latest lease values in the page table for avoiding, when possible, TLB shootdowns. The described embodiments do this by using the latest lease values for page table entries to determine whether any valid cached copies of information based on page table entries are present in TLBs. More specifically, before modifying a page table entry, a processor (e.g., a memory management unit in the initiating processor, an operating system executing on the initiating processor, etc.) checks the latest lease value associated with the page table entry. When the latest lease value has passed, indicating that the lease for each copy of information based on the page table entry held in the TLBs has expired, the processor can modify the page table entry without performing a TLB shootdown. In other words, because the lease for each copy of information based on the page table entry in a TLB is known to have expired and the copies are therefore invalid, it is also known that each core will trigger a page table walk to retrieve information from the page table entry. The processor can therefore modify the page table entry without invalidating copies of the page table entry in the TLBs (as happens during a TLB shootdown). In contrast, when the latest lease value has not passed, at least one copy of information based on the page table entry cached in a TLB is still valid (and thus may still be used by the corresponding core). In this case, before modifying the page table entry, the processor may: (a) perform a TLB shootdown, or (b) wait until the latest lease value passes (i.e., wait until the lease for all copies of information based on the page table entry in TLBs have expired and the copies have therefore become invalid).

By using the lease value and latest lease value to avoid performing TLB shootdowns, the described embodiments can improve the speed and efficiency of operations involving modifications to page table entries (e.g., in terms of delay, communication bandwidth, power consumption, etc.). Improving these operations can, in turn, improve the overall operation of the computing device. For example, instead of performing a TLB shootdown, the computing device can perform other operations.

Computing Device

Figure 1:
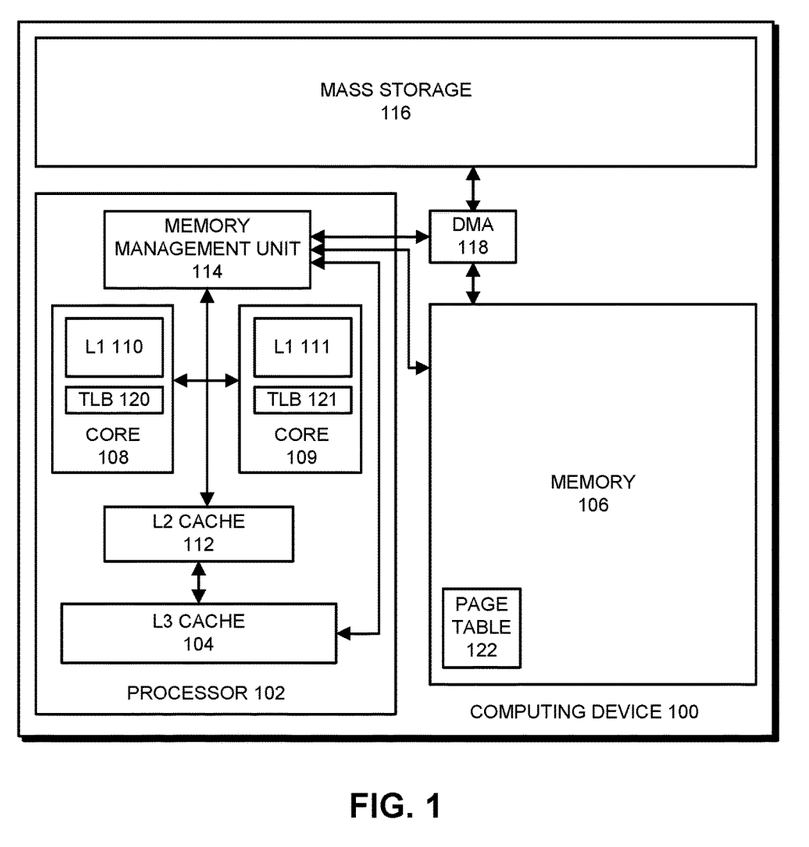
FIG. 1 presents a block diagram illustrating a computing device in accordance with some embodiments.

FIG. 1 presents a block diagram illustrating a computing device 100 in accordance with some embodiments. As can be seen in FIG. 1, computing device 100 includes processor 102, memory 106, mass storage 116, and direct memory access mechanism 118 ("DMA 118"). Processor 102 is a device that performs computational operations in computing device 100. Processor 102 includes two cores, cores 108 and 109, each of which includes one or more computational mechanisms such as central processing units (CPUs), graphics processing units (GPUs), embedded processors, application specific integrated circuits (ASICs), and/or other computational mechanisms.

Processor 102 also includes cache memories (or "caches") that are used for locally storing data and instructions that are used by the cores 108 for performing computational operations. As can be seen in FIG. 1, the caches in processor 102 include a level-one (L1) caches 110 and 111 ("L1 110" and "L1 111") in each of cores 108 and 109, each L1 cache including memory circuits such as one or more of static random access memory (SRAM), dynamic random access memory (DRAM), double data rate synchronous DRAM (DDR SDRAM), and/or other types of memory circuits for storing data and instructions for use by the corresponding core 108 and 109, as well as control circuits for handling accesses of the data and instructions that are stored in the memory circuits. In some embodiments, L1 caches 110 and 111 are the smallest of a set of caches in processor 102 (in terms of the capacity of the memory circuits) and are located closest to the functional blocks (e.g., execution units, instruction fetch units, etc.) that use the data and instructions in the corresponding core 108.

Processor 102 additionally includes a shared level-two (L2) cache 112 that includes memory circuits such as one or more of SRAM, DRAM, DDR SDRAM, and/or other types of memory circuits for storing data and instructions for use by both the cores 108, as well as control circuits for handling accesses of the data and instructions that are stored in the memory circuits. In some embodiments, L2 cache 112 is larger than L1 caches 110 and 111, and is located further than L1 caches 110 and 111 from the functional blocks that use the data and instructions.

Processor 102 further includes a shared level-three (L3) cache 104 that includes memory circuits such as one or more of SRAM, DRAM, DDR SDRAM, and/or other types of memory circuits for storing data and instructions for use by both the cores 108, as well as control circuits for handling accesses of the data and instructions that are stored in the memory circuits. In some embodiments, L3 cache 104 is the largest of the caches in processor 102, and is located the furthest from the functional blocks that use the data and instructions (relative to L1 caches 110 and 111 and L2 cache 112).

Memory 106 is the "main memory" of computing device 100, and includes memory circuits such as one or more of DRAM, DDR SDRAM, non-volatile random access memory (NVRAM), and/or other types of memory circuits for storing data and instructions for use by functional blocks in computing device 100, as well as control circuits for handling accesses of the data and instructions that are stored in the memory circuits. In some embodiments, memory 106 includes significantly more memory circuits (in terms of the capacity of the memory circuits) than the caches in computing device 100, but is slower to access than the caches.

Mass storage 116 is a mass-storage device such as a high-capacity semiconductor memory (a non-volatile semiconductor memory such as a flash memory, an NVRAM, etc.), a disk drive (hard drive, etc.), an optical drive, etc. that stores data and instructions for use in computing device 100. In the described embodiments, mass storage 116 holds data and instructions that are retrieved by memory management unit 114 to be stored in memory 106 for subsequent use by functional blocks in computing device 100. For example, data and instructions may be retrieved from mass storage 116 in blocks of a given size (e.g., 4 kB, 8 kB, etc.), which are called "pages," and the pages can be stored in memory 106 in preparation for accesses by cores 108 and 109, the caches, etc. in processor 102. In addition, pages may be newly created at an available physical location in the memory (e.g., when a block of memory is created for storing computational results, etc.).

Memory management unit 114 is a functional block that handles memory access requests in processor 102. When data or instructions are to be accessed by a functional block in processor 102 (i.e., read, written, checked/verified, deleted, invalidated, etc. by core 108 or another functional block), the functional block sends a memory access request to memory management unit 114. Memory management unit 114 then sends a corresponding request to one or more of L2 cache 112, L3 cache 104, and memory 106 for satisfaction/resolution of the memory access request. For example, if data is to be retrieved based on the memory access request, memory management unit 114 may acquire the data from L2 cache 112, L3 cache 104, or memory 106 (or mass storage 116, should the data not be present in one of L2 cache 112, L3 cache 104, or memory 106) and forward the data to the requesting functional block.

In the described embodiments, computing device 100 uses virtual memory to enable software programs (e.g., executed by cores 108 and 109) to access memory without managing the physical locations of pages in memory 106. As described above, for virtual memory, programs access memory using "virtual addresses" in "virtual address spaces," which are local address spaces that are specific to corresponding programs, instead of accessing memory using addresses based on the physical locations of pages (or "physical addresses"). In these embodiments, upon receiving a memory access request from a program with a virtual address, memory management unit 114 performs operations for translating the virtual address into the physical address for the pages where data is located in memory 106.

In some embodiments, memory management unit 114 uses two mechanisms for performing virtual address to physical address translations. The first of the mechanisms is page table 122, which is a data structure (e.g., a table, an array, a list, etc.) that is stored in memory 106. In some embodiments, page table 122 stores at least one translation for each page present in memory 106. Thus, in these embodiments, if a page has been copied from mass storage 116 to memory 106 or newly created in memory 106 and remains available in memory 106, a corresponding virtual address to physical address translation should exist in page table 122. Upon receiving a memory access request from a program with a virtual address, memory management unit 114 searches page table 122 (or performs a "page table walk") to acquire the physical address for the virtual address. Page table 122 is described in more detail below.

The second of the mechanisms for performing virtual address to physical address translations is translation lookaside buffers 120 and 121 ("TLB 120" and "TLB 121"), which are caches in each of core 108 and 109 that are configured to store/cache virtual address to physical address translation information acquired during page table walks of page table 122. Cores 108 and 109 acquire virtual address to physical address translation information from the corresponding TLB 120 and 121 when possible to avoid performing a page table walk. TLBs 120 and 121 are described in more detail below.

Direct memory access mechanism 118 is a functional block that is configured to perform transfers of data from mass storage 116 to memory 106 and vice versa. Generally, direct memory access mechanism 118 offloads data transfer operations from processor 102, which enables processor 102 to avoid performing some of the computational work involved with performing memory transfers. This in turn enables processor 102 to perform other computational operations instead of and/or in parallel with memory transfers that are performed by direct memory access mechanism 118. In some embodiments, the operation of copying a page of data from mass storage 116 to memory 106 as described herein is performed by direct memory access mechanism 118 based on a request received from memory management unit 114.

In some embodiments, communication paths (that include one or more busses, wires, guides, and/or other connections) are coupled between the various functional blocks in computing device 100 (processor cores 108 and 109, memory management unit 114, memory 106, etc.), as shown by arrow-headed lines between the elements. The communication paths are used to transmit commands, data, control signals, and/or other information between the functional blocks.

Although embodiments are described with a particular arrangement of cores, some embodiments include a different number and/or arrangement of cores. For example, some embodiments have only one core, while other embodiments have two, five, eight, or another number of cores. Generally, the described embodiments can use any arrangement of cores that can perform the operations herein described.

Although embodiments are described with a particular arrangement of caches, some embodiments include a different number and/or arrangement of caches. For example, some or all of the caches (e.g., L1 cache 110 and 111, etc.) may be divided into separate instruction and data caches. Additionally, L2 cache 112 may not be shared, and hence may only be used by a single core (i.e., there may be two L2 caches in processor 102). As another example, some embodiments include different levels of caches, from only one level of cache to multiple levels of caches, and these caches may be located in processor 102 and/or external to processor 102. Generally, the described embodiments can use any arrangement of caches that can perform the operations herein described.

Although embodiments are described for which computing device has one memory management unit 114, some embodiments have a different number and/or arrangement of memory management units. For example, in some embodiments, each of cores 108 and 109 has a separate memory management unit 114. Generally, the described embodiments include sufficient memory management units to perform the operations herein described.

Although a particular arrangement of TLBs is shown in FIG. 1, in some embodiments a different arrangement of TLBs is used in computing device 100. For example, in some embodiments, separate data and instruction TLBs are used in computing device 100. As another example, in some embodiments, a hierarchy of TLBs is used, the hierarchy including two or more levels of TLB with corresponding access times and sizes (i.e., number of entries). Generally, the described embodiments include sufficient TLB(s) to perform the operations herein described.

Although computing device 100 and processor 102 are simplified for illustrative purposes in FIG. 1, in some embodiments, computing device 100 and/or processor 102 include additional mechanisms for performing the operations herein described and other operations. For example, computing device 100 and/or processor 102 may include power controllers, batteries, media processors, input-output mechanisms, communication mechanisms, networking mechanisms, display mechanisms, etc.

Computing device 100 can be or can be included in any electronic device that performs computational operations. For example, computing device 100 can be or can be included in electronic devices such as desktop computers, laptop computers, wearable computing devices, tablet computers, smart phones, servers, network appliances, toys, audio-visual equipment, home appliances, controllers, vehicles, etc., and/or combinations thereof.

Page Table

Figure 2:
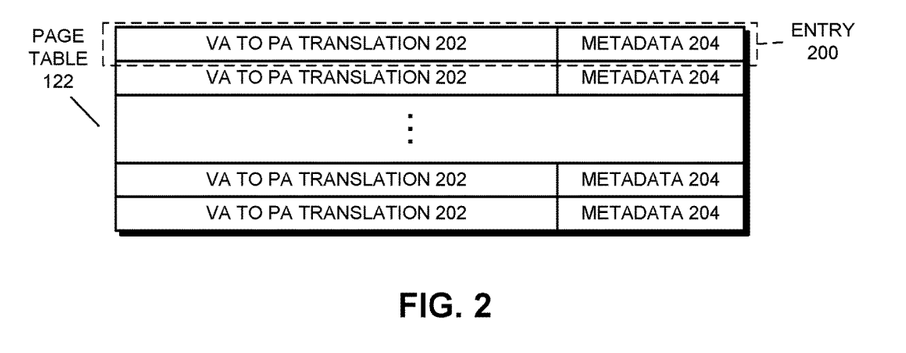
FIG. 2 presents a block diagram illustrating a page table in accordance with some embodiments.

As described above, computing device 100 uses a page table for performing virtual address to physical address translations. FIG. 2 presents a block diagram illustrating page table 122 in accordance with some embodiments. As can be seen in FIG. 2, page table 122 includes a number of entries 200 (an entry 200 is highlighted using a dashed line in FIG. 2), each of which is configured to store a virtual address ("VA") to physical address ("PA") translation 202 along with corresponding metadata 204.

Virtual address to physical address translation 202 indicates a physical location (e.g., starting address in memory 106) of a page (i.e., a block of data of a given size, such as 4 kB, 8 kB, etc.) in memory where data associated with one or more virtual addresses is located. For example, in some embodiments, each virtual address to physical address translation 202 includes a first field with some or all of one or more virtual addresses and a second field with some or all of a physical address to which the one or more virtual addresses map/match. For instance, in some embodiments, the first field in each virtual address to physical address translation 202 includes a subset of the bits (e.g., an upper 40, 36, etc. bits) of a virtual address and the second field includes a subset of the bits of a corresponding physical address. In some embodiments, as pages are retrieved from mass storage 116 and stored in memory 106 or newly created in memory 106, corresponding entries 200 are added to page table 122 with virtual address to physical address translations 202. Thus, if a page has been copied from mass storage 116 to memory 106 or newly created in memory 106 (and remains available in memory 106), a corresponding virtual address to physical address translation 202 should exist in page table 122.

Figure 3:
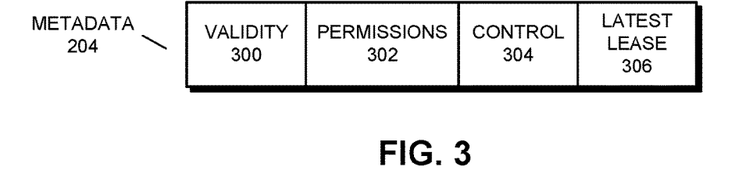
FIG. 3 presents a block diagram illustrating metadata for a page table entry in accordance with some embodiments.

Metadata 204 includes information associated with, characterizing, controlling, and/or otherwise relevant to the corresponding virtual address to physical address translation 202. When a virtual address to physical address translation 202 is added to page table 122, metadata is acquired, generated, etc. and added to a corresponding entry 200 as metadata 204. FIG. 3 presents a block diagram illustrating metadata 204 in accordance with some embodiments. As can be seen in FIG. 3, metadata 204 includes validity 300, which includes one or more values that relate to the validity of the corresponding virtual address to physical address translation 202 and/or the corresponding page in memory 106. For example, validity 300 may include one or more bits indicating whether the corresponding page in memory 106 is valid/accessible and/or whether the entry 200 itself is valid/accessible.

Metadata 204 also includes permissions 302, which includes one or more values that relate to access permissions for the corresponding page in memory 106. For example, metadata 204 may include one or more bits that indicate whether the corresponding page in memory 106 has read-only or read-write permissions set, whether the page is only accessible with particular privileges (administrator, user, kernel, etc), and/or other permissions information.

Metadata 204 also includes control 304, which includes one or more values that relate to the use of the entry 200 and/or the corresponding page in memory 106. For example, control 304 may include a page size indicator, a dirty indicator (for when the corresponding page in memory 106 has been modified and is therefore inconsistent with the associated block of memory on mass storage 116), an accessed indicator (for when the page in memory 106 has been accessed one or more times), a write-through indicator (for when modifications to the page in memory 106 are to be reflected immediately in the associated block of memory on mass storage 116), and/or other values.

Metadata 204 also includes latest lease 306, which includes a value (e.g., one or more bits) representing an absolute or relative time of, until, etc. the expiration of the longest existing lease for a copy of the virtual address to physical address translation 202 that is held in a TLB (e.g., TLB 120 and/or 121). For example, latest lease 306 may include a value that describes a particular system time from a starting point (e.g., a number of seconds since a specified start time, etc.), a year-month-day-hour-minute-second-milliseconds value, etc. As another example, latest lease 306 may include a reduced, compressed, or simplified value that represents the time in an abbreviated or shortened form, such as holding only a few relevant bits or bytes of a longer-form time value, holding the output of a hash function for which the input is a time value, etc. For instance, when the longest existing lease for a virtual address to physical address translation held in a TLB is 500 milliseconds, 1 second, 5 seconds, etc., the year-month-day-hour-minute may be left off, discarded, removed from, etc. a time value that would normally include all of year-month-day-hour-minute-second-milliseconds. As yet another example, in a system that tracks time in segments such as epochs, latest lease 306 may include a segment counter such as an epoch counter. As yet another example, in a system that monitors or keeps track of the occurrence of events (e.g., periodic or asynchronous events, interrupt events, etc.), latest lease 306 may include an event counter, identifier, etc. Generally, in the described embodiments, latest lease 306 includes sufficient information to enable computing device 100 (e.g., memory management unit 114, a corresponding core 108 or 109, etc.) to determine whether all existing leases for the corresponding virtual address to physical address translation 202 have expired. For example, if cores 108 and 109 both hold a copy of a virtual address to physical address translation in the corresponding TLB 120 and 121, with core 108 having a lease value of time P and core 109 having a lease value of time K, where time P occurs after time K, the corresponding latest lease 306 will indicate time P—thereby indicating that at least one core (i.e., core 108 in this example) has the virtual address to physical address translation cached with an expiration time P.

In some embodiments, latest lease 306 includes information in addition to the value representing the expiration of the longest existing lease. For example, in some embodiments, latest lease 306 includes a counter value that is used to count a number of TLBs in which a copy of the virtual address to physical address translation 202 is held or was recently held (e.g., is/was held with an existing lease within a threshold time of the longest existing lease, etc.). As another example, in some embodiments, latest lease 306 includes one or more identifiers of the TLB or TLBs that hold the copy of the virtual address to physical address translation with longest existing lease.

As described herein, one or both of virtual address to physical address translation 202 and metadata 204 may be modified/changed, updated, etc. after being added to page table 122. For example, when a page is moved from a first location to a second location in memory 106, a virtual address to physical address translation 202 in the corresponding entry 200 can be updated. As another example, in an embodiment where metadata 204 includes permissions 302 (e.g., read/write permissions), permissions 302 can be updated to indicate the read only, read-write, etc. permissions for the corresponding page in memory 106. In order to perform the modification, the described embodiments use latest lease 306 to determine either of cores 108 and 109 has a copy of the virtual address to physical address translation 202 cached in the corresponding TLB, as described herein.

As described above, when attempting to acquire physical address information for a specified virtual address, memory management unit 114 (or another entity in computing device 100) may perform a page table walk. During the page table walk, memory management unit 114 uses a corresponding search technique, such as a sequential or entry-by-entry check, to search page table 122 in memory 106 to find an entry 200, should such an entry 200 exist, in which a corresponding virtual address to physical address translation 202 is held. Upon encountering such an entry 200, memory management unit 114 acquires, from the entry 200, the physical address for the specified virtual address (i.e., from the virtual address to physical address translation 202 in the entry 200). If memory management unit 114 is unable to find an entry 200 with the corresponding virtual address to physical address translation, an error-handling operation is performed (e.g., a page fault is emitted and subsequently processed, etc.).

Although page table 122 is shown with a particular number of entries 200, some embodiments include a different number of entries 200 (as shown by the ellipsis in FIG. 2). In addition, although entry 200 and metadata 204 are shown with particular arrangements and types of information, in some embodiments, one or both of entry 200 and metadata 204 include different information. For example, in some embodiments, at least some of the above-described metadata is stored in a location other than in an entry 200. For instance, in some embodiments, a separate in-memory data structure is used for storing the latest lease values. Generally, page table 122 includes sufficient information to enable computing device 100 to store and retrieve virtual address to physical address translation information and handle page table entry modifications as described herein.

Translation Lookaside Buffer

Figure 4:
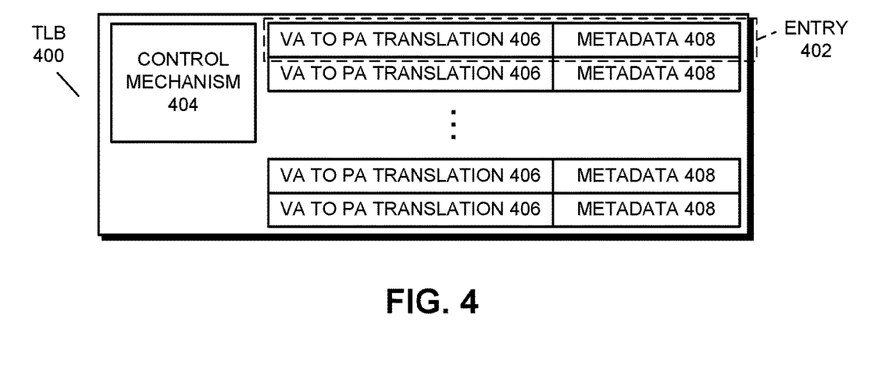
FIG. 4 presents a block diagram illustrating a TLB in accordance with some embodiments.

As described above, computing device 100 includes TLBs 120 and 121 in cores 108 and 109, respectively. Each TLB is a cache that is configured to store virtual address to physical address translation information acquired during page table walks of page table 122 for access by the corresponding core, memory management unit 114, etc. FIG. 4 presents a block diagram illustrating a TLB 400 in accordance with some embodiments. In some embodiments, one or both of TLBs 120 and 121 are arranged similarly to TLB 400.

As shown in FIG. 4, TLB 400 includes control mechanism 404 and a number of entries 402 (an entry 402 is highlighted using a dashed line in FIG. 4), each of which is configured to store a virtual address ("VA") to physical address ("PA") translation 406 along with corresponding metadata 408.

Virtual address to physical address translation 406 indicates a physical location (e.g., a starting address in memory 106) of the page in memory 106 where data associated with one or more virtual addresses is located. For example, in some embodiments, each virtual address to physical address translation 406 includes a first field with some or all of one or more virtual addresses and a second field with some or all of a physical address in memory 106 to which the one or more virtual addresses map/match. In some embodiments, when virtual address to physical address translations 202 and corresponding metadata 204 are acquired from page table 122 (i.e., during page table walks), virtual address to physical address translation 406 and metadata 408 are updated in entries 402 based at least in part on the virtual address to physical address translations 202 and/or the corresponding metadata 204.

In some embodiments, the virtual address to physical address translation information is copied directly from the corresponding page table entry, but in other embodiments, one or more operations (e.g., reductions, reformatting, hashing, etc.) is performed before virtual address to physical address translation information from a page table entry is stored in virtual address to physical address translation 406. For example, in some embodiments, TLB 400 includes a multi-level lookup mechanism (not shown) in which virtual address to physical address translation 406 is stored, and the virtual address to physical address translation information from page table 122 is divided into portions to be stored in each level of the multi-level lookup mechanism.

In some embodiments, because the number of entries 402 in TLB 400 is limited, updating an entry 402 in TLB 400 may involve overwriting existing information in an entry 402. For example, when specified entries 402 in TLB 400 (e.g., all, a particular subset of, etc.) hold virtual address to physical address translations, a next virtual address to physical address translation to be written to TLB 400 will overwrite an existing virtual address to physical address translation in an entry 402. In these embodiments, a policy such as first-in-first-out, least recently used, most often used, etc. may be used to determine which entry 402 is to be overwritten. In addition, in some embodiments, the entries in TLB 400 are managed using a particular type of associativity, such as direct mapping, set associativity, skewed associativity, etc. In other words, in some embodiments, TLB 400, which is a cache, may be managed using various replacement techniques.

Metadata 408 includes information associated with, characterizing, controlling, and/or otherwise relevant to the corresponding virtual address to physical address translation 406. In some embodiments, as virtual address to physical address translation 406 is acquired during a page table walk, metadata is acquired, generated, etc. and added to a corresponding entry 402 (or stored elsewhere in TLB 400).

Figure 5:
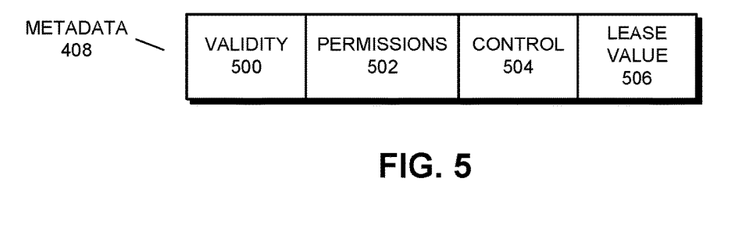
FIG. 5 presents a block diagram illustrating metadata for an entry in a TLB in accordance with some embodiments.

FIG. 5 presents a block diagram illustrating metadata 408 in accordance with some embodiments. As can be seen in FIG. 5, metadata 408 includes validity 500, which includes one or more values that relate to the validity of the corresponding virtual address to physical address translation 406 and/or the corresponding page in memory 106. For example, validity 500 may include one or more bits indicating whether the corresponding page in memory 106 is valid/accessible and/or whether the entry 402 itself is valid/accessible.

Metadata 408 also includes permissions 502, which includes one or more values that relate to the access permissions for the corresponding page in memory 106. For example, permissions 502 may include one or more bits that indicate whether the corresponding page in memory 106 has read-only or read-write permissions set, whether the page is only accessible with particular privileges (administrator, user, kernel, etc), and/or other permissions information.

Metadata 408 also includes control 504, which includes one or more values that relate to the use of the entry 402 and/or the corresponding page in memory 106. For example, control 504 may include a page size indicator, a dirty indicator (for when the corresponding page in memory 106 has been modified and is therefore inconsistent with the associated block of memory on mass storage 116), an accessed indicator (for when the page in memory 106 has been accessed one or more times), a write-through indicator (for when modifications to the page in memory 106 are to be reflected immediately in the associated block of memory on mass storage 116), and/or other values.

Metadata 408 also includes lease value 506, which includes a value (e.g., one or more bits) representing an absolute or relative time of, until, etc. the expiration of a lease for the virtual address to physical address translation 406. As described herein, when the lease for the virtual address to physical address translation 406 expires, the virtual address to physical address translation 406 is considered invalid and may no longer be used for specified operations (e.g., translating virtual addresses to physical addresses, determining permissions for a corresponding page in memory 106, etc.). For example, lease value 506 may include a value that describes a particular system time from a starting point (e.g., a number of seconds since a specified start time, etc.), a year-month-day-hour-minute-second-milliseconds value, etc. As another example, lease value 506 may include a reduced, compressed, or simplified value that represents the time in an abbreviated or shortened form, such as holding only a few relevant bits or bytes of a longer-form time value, holding the output of a hash function for which the input is a time value, etc. For instance, when the longest existing lease for a corresponding virtual address to physical address translation 406 is 500 milliseconds, 1 second, 5 seconds, etc., the year-month-day-hour-minute may be left off, discarded, removed from, etc. a time value that would normally include all of year-month-day-hour-minute-second-milliseconds. As yet another example, in a system that tracks time in segments such as epochs, lease value 506 may include a segment counter such as an epoch counter. As yet another example, in a system that monitors or keeps track of the occurrence of events (e.g., periodic or asynchronous events, interrupt events, etc.), lease value 506 may include an event counter, identifier, etc. Generally, in the described embodiments, lease value 506 includes sufficient information to enable computing device 100 (e.g., memory management unit 114, a corresponding core, etc.) to determine whether a lease for the corresponding virtual address to physical address translation 406 has expired. For example, if lease value 506 for a given virtual address to physical address translation 406 is F, where F is an absolute or relative time, and the system time is currently H, a time value that is past F, the lease has expired and the virtual address to physical address translation 406 is considered invalid. Otherwise, if H is a time value that is not past F (i.e., earlier than F), the lease has not expired and the virtual address to physical address translation 406 is considered to be valid (at least with regard to the lease value—the virtual address to physical address translation 406 may be considered invalid for other reasons).

Returning to FIG. 4, control mechanism 404 is a functional block that is configured to perform various operations for acquiring, using, and managing information in entries 402. For example, control mechanism 404 may store virtual address to physical address translation information in entries 402, use the information in entries 402 to perform virtual address to physical address translations, determine lease values and/or other metadata values, update metadata with lease values and/or other values, etc.

During operation, when memory management unit 114 (and/or another hardware or software entity in computing device 100) is to translate a virtual address into a physical address, memory management unit 114 sends a request that includes some or all of the virtual address to control mechanism 404 in TLB 400. Control mechanism 404 then uses a corresponding search technique, such as a sequential or in-order entry-by-entry check, address matching, etc., to find an entry 402, should such an entry 402 exist, in which a corresponding virtual address to physical address translation 406 is held. For example, in some embodiments, TLB 120 includes a content addressable memory in which entries 402 are located, and the control mechanism searches for the virtual address in the content addressable memory. As another example, in some embodiments, TLB 120 includes a table, a directory, and/or another data structure in which entries 402 are located, and the control mechanism performs a corresponding search in the table, directory, and/or other data structure. Upon encountering entry 402 with the corresponding virtual address to physical address translation 406, control mechanism 404 acquires, from the entry 402, the physical address for the specified virtual address (i.e., from the virtual address to physical address translation 406) and returns the physical address translation to memory management unit 114. If there is no entry 402 in TLB 400 with the virtual address to physical address translation, the search for the virtual address to physical address translation "misses" in the TLB 400 and control mechanism 404 signals a miss to memory management unit 114. Memory management unit 114 then commences a page table walk to acquire the virtual address to physical address translation.

Although TLB 400 is shown with a particular arrangement of functional blocks, in some embodiments, TLB 400 is arranged differently. For example, in some embodiments, TLB 400 is configured with functional elements (a directory, one or more tables, etc.) for performing a multi-level search for virtual address to physical address translation information. Generally, the described embodiments can use any internal arrangement of TLB 400 in which the above-described lease values 506 are associated with corresponding virtual address to physical address translations. Also, although TLB 400 is shown with a particular number of entries 402, some embodiments include a different number of entries 402 (as shown by the ellipsis in FIG. 4). Additionally, although entries 402 and metadata 408 are shown with particular arrangements and types of information, in some embodiments, one or both of entries 402 and metadata 408 include more or different information. For example, some or all of metadata 408 may be stored in another location in TLB 400, such as a metadata record data structure (not shown). Generally, entries 402 and metadata 408 include sufficient information to enable computing device 100 to perform the operations herein described.

Setting a Lease Value and a Latest Lease Value

Figure 6:
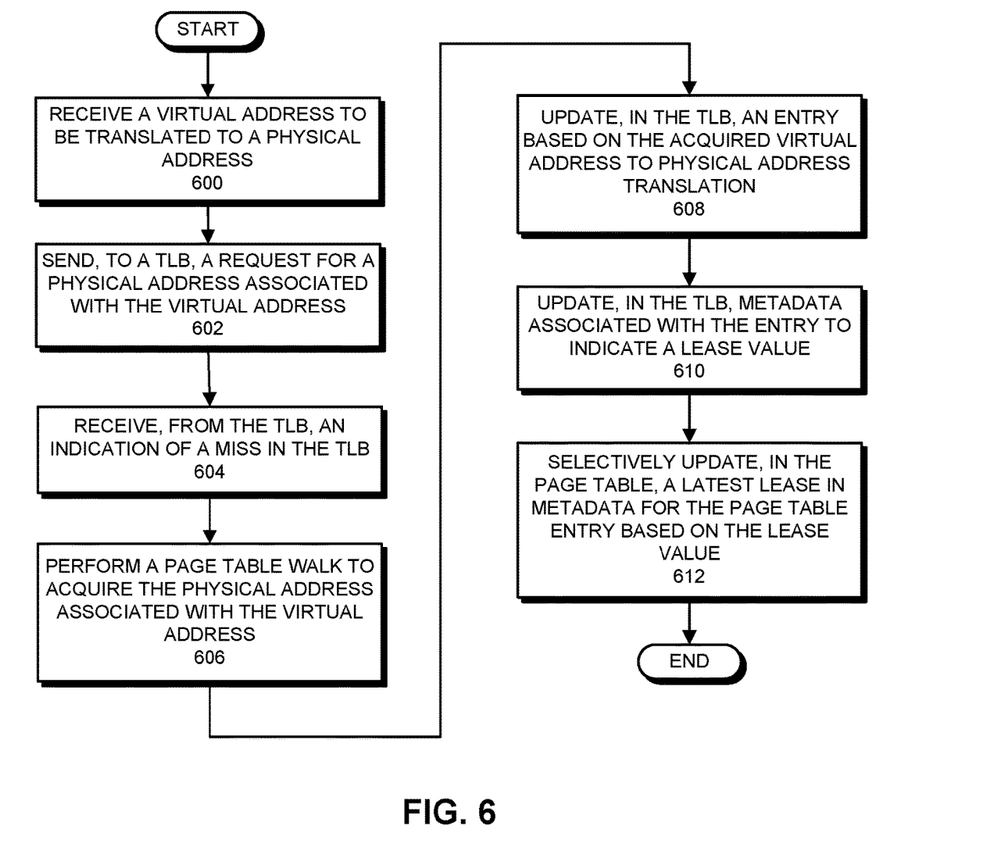
FIG. 6 presents a flowchart illustrating a process for setting a lease value for an entry in a TLB and a latest lease value for a corresponding page table entry in accordance with some embodiments.

FIG. 6 presents a flowchart illustrating a process for setting a lease value for an entry in a TLB and a latest lease value for a corresponding page table entry in accordance with some embodiments. Note that the operations shown in FIG. 6 are presented as a general example of operations performed by some embodiments. The operations performed by other embodiments include different operations and/or operations that are performed in a different order. Additionally, although certain mechanisms are used in describing the operations (e.g., memory management unit 114, core 108/TLB 120, etc.), in some embodiments, other mechanisms may perform the operations. For example, core 109/TLB 121 may perform the operations instead of core 108/TLB 120.

The process shown in FIG. 6 starts when memory management unit 114 receives a virtual address to be translated into a physical address (step 600). For example, memory management unit 114 may receive, from core 108, a request to perform a memory access such as a memory write that includes the virtual address. Memory management unit 114 then acquires (e.g., extracts, determines, etc.), from the memory access request, the virtual address.

Memory management unit 114 next sends a request to TLB 120 for the physical address associated with the virtual address (step 602). In other words, memory management unit 114 requests that TLB 120 determine the physical address based on a corresponding virtual address to physical address translation stored in an entry in TLB 120 (if such an entry is present) and return the physical address. For this example, it is assumed that none of the entries in TLB 120 include the corresponding virtual address to physical address translation for the virtual address—and therefore the request "misses" in TLB 120. Memory management unit 114 therefore receives, from TLB 120, an indication of the miss in the TLB 120 (step 604).

Because the lookup in TLB 120 resulted in a miss, memory management unit 114 performs a page table walk to acquire the physical address associated with the virtual address from page table 122 (step 606). During the page table walk, memory management unit 114 searches page table 122 for a page table entry that has the physical address associated with the virtual address (i.e., that has the corresponding virtual address to physical address translation). In some embodiments, the page table walk is performed using a technique such as a sequential or entry-by-entry search, a hierarchical search (e.g., using a directory, a hashing scheme, etc.), and/or another technique. For this example, it is assumed that page table 122 includes a page table entry with the corresponding virtual address to physical address translation. If not, a remedial action (e.g., page fault) is performed.

Memory management unit 114 then updates an entry in TLB 120 with the acquired virtual address to physical address translation (step 608). As described above, the updating includes storing, in the entry, information that can be used directly or indirectly to determine the corresponding physical address based on a known virtual address. For example, in some embodiments, each entry includes a first field that includes some or all of one or more virtual addresses (e.g., at least a portion of a set of bits in the one or more virtual addresses) and a second field that includes some or all of a corresponding physical address (e.g., a starting address of a page of memory, an offset from a known address, etc.).

In some embodiments, TLB 120 is managed using a replacement algorithm and the virtual address to physical address translation is stored in an entry in accordance with the rules, policies, etc. of the replacement algorithm. For example, TLB 120 may be managed at least in part using set associativity and the entry for storing the virtual address to physical address translation may be chosen from a corresponding set.

In addition to storing the virtual address to physical address translation in the entry, memory management unit 114 (and/or another entity, such as TLB 120, core 108, etc.) updates metadata associated with the entry in TLB 120. When updating the metadata associated with the entry, memory management unit 114 may determine, generate, or otherwise acquire information to be used for updating the metadata from various sources. For example, memory management unit 114 may acquire or determine at least some of the information for the update based on metadata (e.g., metadata 204) associated with the page table entry that is acquired from page table 122. For instance, memory management unit 114 may acquire metadata for the page table entry in page table 122 that indicates access permissions for the corresponding page in memory 106 and update metadata for the entry in TLB 120 to indicate the access permissions. As another example, memory management unit 114 may generate information, values, etc. to be used for updating the metadata. For instance, memory management unit 114 may set validity information for the entry in TLB 120, may set or update access counters associated with the entry, etc. As yet another example, memory management unit 114 may acquire information for updating the metadata from one or more other functional blocks in computing device (e.g., cores 108 and/or 109, memory 106, etc.). Generally, memory management unit 114 (and/or another entity) acquires sufficient information for updating the metadata as described herein.

When updating the metadata associated with the entry, memory management unit 114 updates a lease value in the metadata for the entry in TLB 120 (step 610). Generally, for this operation, memory management unit 114 first determines a lease value to be used for the virtual address to physical address translation, and then sets the lease value in the metadata for the entry based on the determined lease value. Recall that the lease value is a time for which, or until which, the entry is considered valid and thus allowed to be used during specified operations (e.g., virtual address to physical address translations, accessing metadata for the entry, etc.). To avoid inefficient operation, the lease value should be set to a value that is long enough that the lease for the entry does not expire too soon (which may result in unnecessary page table walks) and/or short enough that the lease does not expire too late (which may result in unnecessary TLB shootdowns or delay).

When determining the lease value, memory management unit 114 generally determines a time at which the entry in TLB 120 is to expire, which may be an absolute/specific time (e.g., a particular hour, minute, second, millisecond, etc.) or a relative/offset time (e.g., X seconds from time Z, etc.). Memory management unit 114 may determine the lease value (i.e., the time) based on information from one or more sources in computing device 100. For example, memory management unit 114 may be configured (e.g., via firmware, inputs received from other hardware or software entities, hardware presets in memory management unit 114, etc.) with a single lease value to be used for all entries in TLB 120. As another example, memory management unit 114 may be configured with two or more lease values to be used for corresponding entries in TLB 120. For instance, memory management unit 114 may include two or more lease values that are used for all TLB 120 entries for physical addresses in specified regions of memory (e.g., ranges of physical addresses).

In some embodiments, the lease values are determined during runtime of computing device 100 (i.e., "dynamically" determined). In these embodiments, the lease values that are used for updating metadata for newly added entries in TLB 120 may change over time as the computing device 100 operates (once set, however, a lease value in a given entry is typically left unchanged—although this is not a requirement). In these embodiments, computing device 100 may avoid using lease values that are too long or too short.

In some embodiments, memory management unit 114 (or another hardware or software entity in computing device 100) is configured with one or more policies, rules, thresholds, etc. that are used for dynamically determining lease values. For example, two or more lease values (i.e., lease durations) may be associated with corresponding runtime condition threshold(s), such as thresholds for a rate of hits or misses in TLB 120, a number of accesses of entries in TLB 120, a number, type, or location of two or more memory accesses, an operating mode of TLB 120 and/or another entity (e.g., memory 106, core 108, etc.), etc. For example, a first lease value may be used when a rate of hits or misses in TLB 120 is below a threshold (e.g., X hits per Y microseconds), while a second lease value is used when a rate of hits or misses in TLB 120 is equal to or greater than the threshold. As another example, two thresholds based on an operating mode of core 108 or computing device 100 (e.g., low power, full power, high performance, etc.) may be used to determine which of three lease values are to be used, so that a first lease value is used below the first threshold (e.g., in a low power mode), a second lease value is used between the first and second thresholds (e.g., in a full power mode), and a third lease value is used above the second threshold (e.g., in a high performance mode).

In some embodiments, lease values may be dynamically determined based on a rate at which attempts are made to modify page table entries for which a latest lease is (or is not) expired. In these embodiments, a lease value may be incrementally shortened as multiple attempts are made to modify page table entries for which a latest lease value is unexpired and/or greater than a threshold value from expiring until a certain number of TLB shootdowns occur. In addition (or alternatively), a lease value may be incrementally lengthened as multiple TLB misses occur due to expired lease values until a specified number of page table walks occur.

In some embodiments, lease values may be dynamically determined based on the properties of pages in memory 106 and/or changes or expected changes in the properties of pages in memory 106. For example, memory management unit 114 may monitor pages, accesses of pages, memory accesses, etc. to determine that one or more properties for one or more pages have changed and/or can be projected to be changed. As another example, a hardware or software entity (e.g., a profiling entity) in computing device 100 may signal memory management unit 114 that one or more properties for one or more pages have been, are projected to be, and/or will be changed. These properties can include any property of or associated with a page that can be used to dynamically determine lease values, including access permissions, page sizes, page locations in memory, a type of program or programs accessing the pages, an operating phase of a program or programs accessing the pages, etc. Memory management unit 114 can then set lease values accordingly, i.e., to avoid using lease values that are too long or too short.

When setting the lease value, memory management unit 114 updates the metadata (e.g., lease value 506) for the entry in TLB 120 with a representation of the time at which the entry in TLB 120 is to expire. As described above, the lease value may be any value that can be recognized by TLB 120, memory management unit 114, etc. as an expiration time. For example, the time can be future system clock time, an offset from a starting time, an epoch identifier/counter/number, an event identifier/counter/number, a countdown time, a reference or pointer to a lease value stored in another location (e.g., elsewhere in TLB 120, in memory 106, etc.), and/or another representation of an expiration time. The time can be stored in any of various forms, including well-known multi-byte representations of time, bit patterns, strings, etc. The time may be stored in a reduced, simplified, and/or compressed format, such as truncating irrelevant or unneeded portions of long-form time representations, a hash of some or all of a time value, etc.

In addition to updating the entry in TLB 120, memory management unit 114 selectively updates, in page table 122, a latest lease value (e.g., latest lease 306) in metadata for the page table entry based on the lease value (step 612). As used here, "selectively" updating means that the latest lease value is updated when a condition is met—that condition being that an existing latest lease value is not a later time than the lease value. For this operation, memory management unit 114 compares the existing latest lease value to the lease value for the entry in TLB 120 to determine whether the existing latest lease value is for an expiration time that is later in time (i.e., after) the lease value for the entry. When the lease value is later than the existing latest lease value, memory management unit 114 overwrites the existing latest lease value with the lease value (or with a value that is representative of, proportional to, etc. the lease value). For example, when the lease value is an absolute/specific time, a relative/offset time, an event-based or epoch-based reference, etc., memory management unit 114 overwrites the latest lease value with (or otherwise based on) the lease value. Otherwise, when the lease value is earlier/sooner than the latest lease value, memory management unit 114 does not update the latest lease value. In this way, the longest/latest expiring lease for the page table entry is maintained in page table 122. This enables the avoidance of TLB shootdowns or delays as described for FIGS. 8-9.

Although step 612 is described as if there is already an existing latest lease value for the page table entry, there may not yet be a latest lease value. For example, if no other copy of the virtual address to physical address translation from the page table entry is stored in a TLB, the latest lease value may be set to a default value (e.g., a time that should already be expired, such as time 0). In this case, the above-described comparison should always result in the overwriting of the latest lease value, because any lease value will be later than the latest lease value.

Using a Lease Value for an Entry in a TLB

Figure 7:
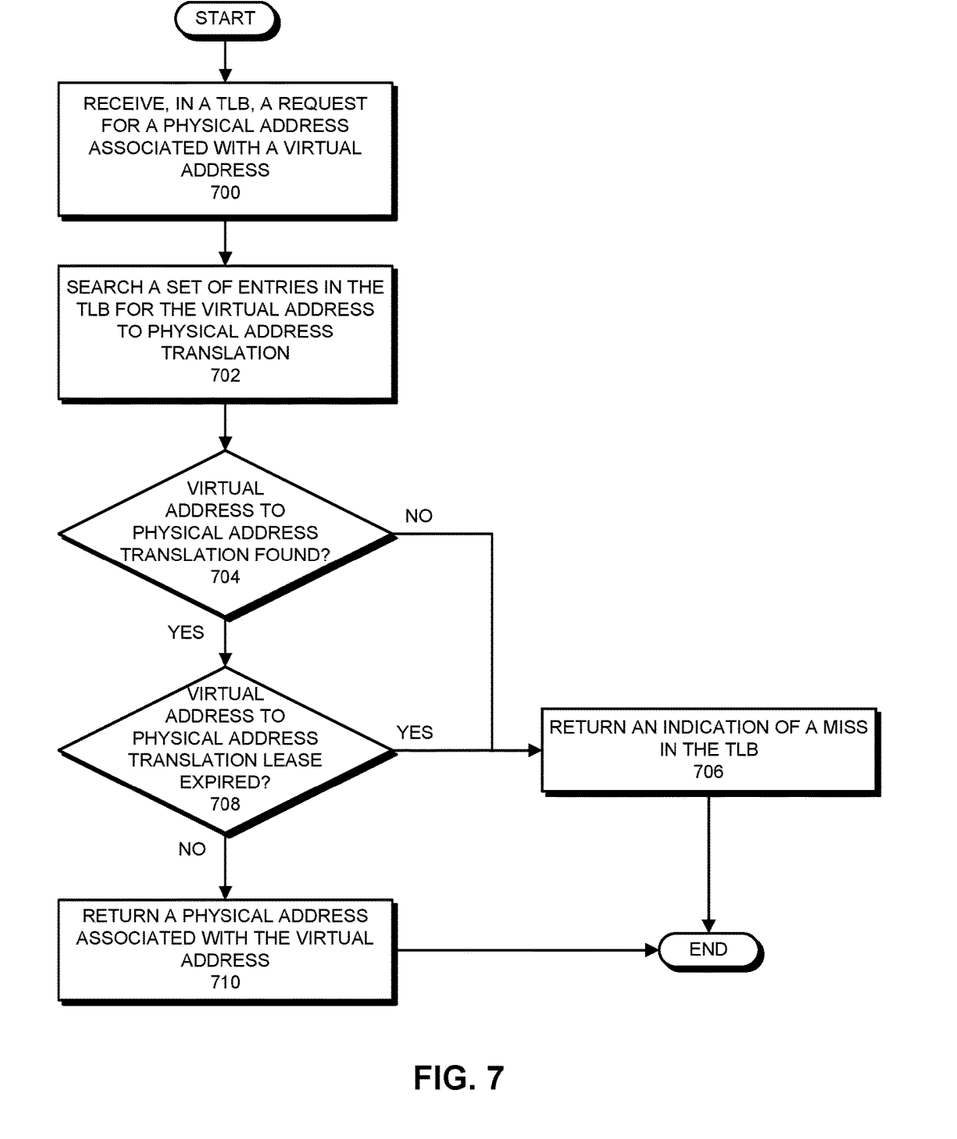
FIG. 7 presents a flowchart illustrating a process for using a lease value for an entry in a TLB in accordance with some embodiments.

FIG. 7 presents a flowchart illustrating a process for using a lease value for an entry in a TLB in accordance with some embodiments. Note that the operations shown in FIG. 7 are presented as a general example of operations performed by some embodiments. The operations performed by other embodiments include different operations and/or operations that are performed in a different order. Additionally, although certain mechanisms are used in describing the operations (e.g., memory management unit 114, core 108/TLB 120, etc.), in some embodiments, other mechanisms may perform the operations. For example, core 109/TLB 121 may perform the operations instead of core 108/TLB 120.

The process shown in FIG. 7 starts when a control mechanism in TLB 120 receives, from memory management unit 114, a request for a physical address associated with a virtual address (step 700). In other words, TLB 120 receives a request for a virtual address to physical address translation of the virtual address.

The control mechanism then searches the entries in TLB 120 for the virtual address to physical address translation (i.e., for an entry in which the virtual address to physical address translation is stored) (step 702). Generally, during this operation, TLB 120 compares some or all of the virtual address to virtual address information for some or all of a set of virtual address to physical address translations stored in an entry in TLB 120. For example, in some embodiments, TLB 120 includes a content addressable memory that stores virtual address to physical address translations and the control mechanism searches for the virtual address in the content addressable memory. As another example, in some embodiments, TLB 120 includes a table, a directory, and/or another data structure and the control mechanism performs a corresponding search in the table, directory, and/or other data structure.

In some embodiments, the virtual address is processed before the search is performed, such as being used to create a hash value using a hash function, being truncated or otherwise reduced, etc. In these embodiments, the virtual address to physical address translations are stored in TLB 120 with tags, keys, pointers, etc. that are generated from corresponding virtual addresses in a similar way.

When the virtual address to physical address translation is not found in TLB 120 (step 704), the control mechanism returns, to memory management unit 114, an indication of a miss in TLB 120 (step 706). Based on receiving the miss, memory management unit 114 performs a page table walk to acquire the virtual address to physical address translation.

When the virtual address to physical address translation is found in TLB 120 (step 704), the control mechanism determines if a lease for the virtual address to physical address translation is expired (step 708). Generally, this operation includes comparing the time (or other value) at which the lease is to expire to a current time (or other reference) to determine if the lease has expired. For example, when the lease value is an absolute/specific time (e.g., hour, minute, second, etc.), the absolute/specific time can be compared to a current system time, a reference timer, and/or another counter or clock. As another example, when the lease value is a relative/offset time, the relative/offset time can be compared to a time value that is computed, determined, etc. based on a current value of an offset timer or counter, a base time value plus an offset, etc. As yet another example, when the lease value is an event-based or epoch-based reference, the event-based or epoch-based reference can be compared to a current event identifier or an epoch counter.

In some embodiments, the lease is determined to have expired when current absolute/specific or relative/offset time exceeds the lease value, when the event-based or epoch-based reference is exceeded, etc. For example, when the system time is P, which is a value later than the lease value of K, the lease is expired. As another example, when an epoch counter in the system is M, which is a counter that is higher than the latest lease value of H, the latest lease is expired.

When the lease has not expired, the control mechanism returns a physical address associated with the virtual address to memory management unit 114 (step 710). For example, when TLB 120 includes a content addressable memory, the control mechanism can retrieve the physical address from the content addressable memory and return the physical address to memory management unit 114. As another example, when TLB 120 includes a directory, table, or other data structure, the control mechanism can perform a corresponding retrieval operation to retrieve the physical address based on the virtual address and return the physical address to memory management unit 114.

Although the lease value is described as being used to control the use of virtual address to physical address translations in TLB 120, access to metadata for the entries can be similarly controlled. For example, if a request is received to acquire access permissions information (read/write, read-only, etc.) for a given virtual address, the lease value can be used as described above to control whether (or not) the permissions information is returned from an entry. Generally, in some embodiments, access to some or all of the information in a given entry may be controlled using the lease value as described.

By returning (or not returning) information from entries in TLB 120 (e.g., the virtual address to physical address translation, metadata, etc.) as described, the described embodiments use the lease value to control a lifetime of entries in TLB 120. In other words, the entries in TLB 120 have a limited life span before they expire and can no longer be used for specified operations. As described herein, this can enable computing device 100 to avoid performing TLB shootdowns.

Using a Latest Lease Value for a Page Table Entry

Figure 8:
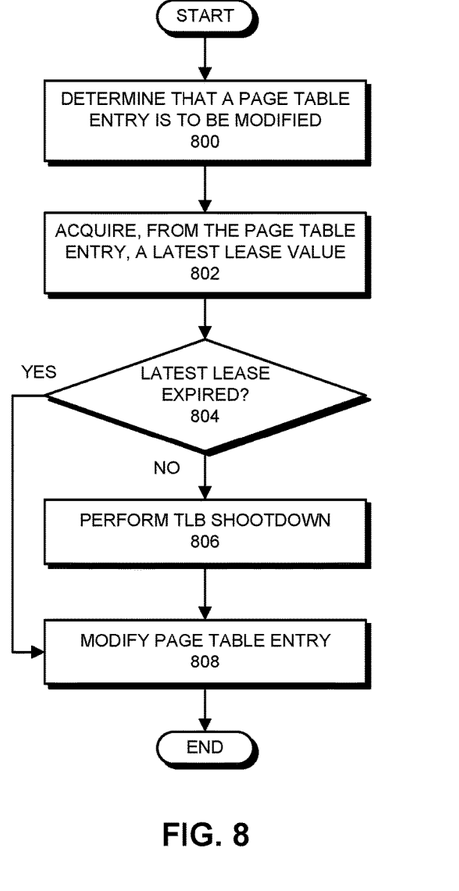
FIG. 8 presents a flowchart illustrating a process for using a latest lease for a page table entry in a page table in accordance with some embodiments.

FIG. 8 presents a flowchart illustrating a process for using a latest lease for a page table entry in page table 122 in accordance with some embodiments. Note that the operations shown in FIG. 8 are presented as a general example of operations performed by some embodiments. The operations performed by other embodiments include different operations and/or operations that are performed in a different order. Additionally, although certain mechanisms are used in describing the operations (e.g., memory management unit 114, core 108/TLB 120, etc.), in some embodiments, other mechanisms may perform the operations. For example, core 109/TLB 121 may perform the operations instead of core 108/TLB 120.

The process shown in FIG. 8 starts when memory management unit 114 determines that a page table entry is to be modified (step 800). For example, memory management unit 114 can receive, from core 108, a request to modify the virtual address to physical address translation in the page table entry—such as when a page of memory has been moved in memory 106, when a virtual address has changed, etc. As another example, memory management unit 114 can receive, from core 108, a request to modify metadata associated with the page table entry—such as when access permissions for the corresponding page in memory 106 have changed, when an access counter is to be changed, etc.

Memory management unit 114 then acquires, from the page table, a latest lease value for the page table entry (step 802). Generally, when acquiring the latest lease value, memory management unit 114 finds the page table entry in page table 122 (e.g., by searching through, or walking, the page table as described above) and acquires from the metadata (e.g., metadata 204) associated with the entry the latest lease value.

Memory management unit 114 then determines whether the latest lease for the page table entry is expired (step 804). More specifically, memory management unit 114 determines, based on the latest lease value, whether all copies of the virtual address to physical address translation based on the page table entry that are held in the TLBs have expired. Generally, this operation includes comparing the time (or other value) at which the latest lease is to expire to a current time (or other reference) to determine if the latest lease has expired. For example, when the latest lease is an absolute/specific time (e.g., hour, minute, second, etc.), the absolute/specific time can be compared to a current system time, a reference timer, and/or another counter or clock. As another example, when the latest lease is a relative/offset time, the relative/offset time can be compared to a time value that is computed, determined, etc. based on a current value of an offset timer or counter, a base time value plus an offset, etc. As yet another example, when the latest lease is an event-based or epoch-based reference, the event-based or epoch-based reference can be compared to a current event identifier or an epoch counter.

In some embodiments, the latest lease is determined to have expired when current absolute/specific or relative/offset time exceeds the latest lease value, when the event-based or epoch-based reference is exceeded, etc. For example, when the system time is P, which is a value later than the latest lease value of K, the latest lease is expired. As another example, when an epoch counter in the system is M, which is a counter that is higher than the latest lease value of H, the latest lease is expired.

When the latest lease has not expired (step 804), and thus there is at least one valid (and thus usable) copy of the virtual address to physical address translation from the page table entry held in a TLB, memory management unit 114 cannot modify the page table entry without causing inconsistency between the page table entry and the copy (or copies). Memory management unit 114 therefore performs a TLB shootdown to invalidate corresponding entries in the TLBs (step 806). As described above, when performing a TLB shootdown, memory management unit 114 causes each TLB that may hold a copy of the virtual address to physical address translation and the metadata from the page table entry to invalidate the copy.

After performing the TLB shootdown, memory management unit 114 modifies the page table entry (step 808). During this operation, memory management unit 114 updates the virtual address to physical address translation and/or the metadata for the page table entry.

When the latest lease has expired (step 804), and thus there are no valid (and thus usable) copies of the virtual address to physical address translation from the page table entry held in the TLB(s), memory management unit 114 can modify the page table entry without causing inconsistency. Memory management unit 114 therefore modifies the page table entry (step 808). Note that this modification is made without performing a TLB shootdown, as the latest lease value can be used to confirm that no copies of the virtual address to physical address translation are held in the TLBs.

Figure 9:
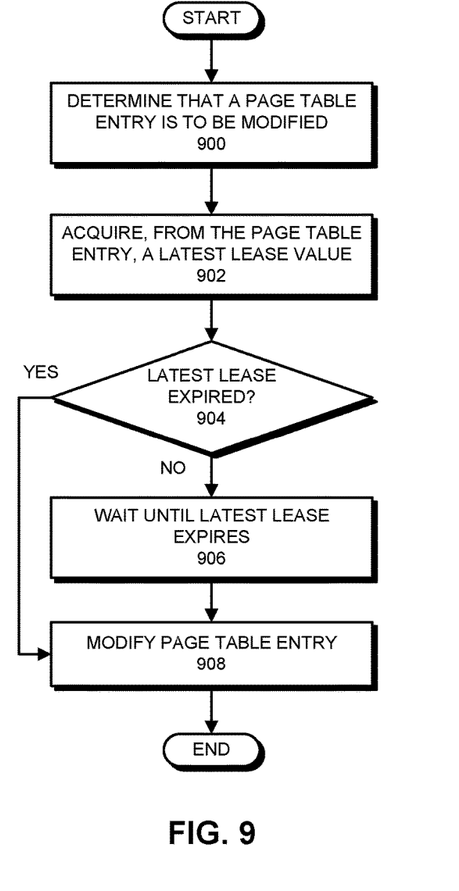
FIG. 9 presents a flowchart illustrating a process for using a latest lease for a page table entry in a page table in accordance with some embodiments.

FIG. 9 presents a flowchart illustrating a process for using a latest lease for a page table entry in page table 122 in accordance with some embodiments. Note that the operations shown in FIG. 9 are presented as a general example of operations performed by some embodiments. The operations performed by other embodiments include different operations and/or operations that are performed in a different order. Additionally, although certain mechanisms are used in describing the operations (e.g., memory management unit 114, core 108/TLB 120, etc.), in some embodiments, other mechanisms may perform the operations. For example, core 109/TLB 121 may perform the operations instead of core 108/TLB 120.

The process shown in FIG. 9 starts when memory management unit 114 determines that a page table entry is to be modified (step 900). For example, memory management unit 114 can receive, from core 108, a request to modify the virtual address to physical address translation in the page table entry—such as when a page of memory has been moved in memory 106, when a virtual address has changed, etc. As another example, memory management unit 114 can receive, from core 108, a request to modify metadata associated with the page table entry—such as when access permissions for the corresponding page in memory 106 have changed, when an access counter is to be changed, etc.

Memory management unit 114 then acquires, from the page table, a latest lease value for the page table entry (step 902). Generally, when acquiring the latest lease value, memory management unit 114 finds the page table entry in page table 122 (e.g., by searching through, or walking, the page table as described above) and acquires from the metadata (e.g., metadata 204) associated with the entry the latest lease value.

Memory management unit 114 then determines whether the latest lease for the page table entry is expired (step 904). More specifically, memory management unit 114 determines, based on the latest lease value, whether all copies of the virtual address to physical address translation based on the page table entry that are held in the TLBs have expired. Generally, this operation includes comparing the time (or other value) at which the latest lease is to expire to a current time (or other reference) to determine if the latest lease has expired. For example, when the latest lease is an absolute/specific time (e.g., hour, minute, second, etc.), the absolute/specific time can be compared to a current system time, a reference timer, and/or another counter or clock. As another example, when the latest lease is a relative/offset time, the relative/offset time can be compared to a time value that is computed, determined, etc. based on a current value of an offset timer or counter, a base time value plus an offset, etc. As yet another example, when the latest lease is an event-based or epoch-based reference, the event-based or epoch-based reference can be compared to a current event identifier or an epoch counter.

In some embodiments, the latest lease is determined to have expired when current absolute/specific or relative/offset time exceeds the latest lease value, when the event-based or epoch-based reference is exceeded, etc. For example, when the system time is P, which is a value later than the latest lease value of K, the latest lease is expired. As another example, when an epoch counter in the system is M, which is a counter that is higher than the latest lease value of H, the latest lease is expired.

When the latest lease has not expired (step 904), and thus there is at least one valid (and thus usable) copy of the virtual address to physical address translation from the page table entry held in a TLB, memory management unit 114 cannot modify the page table entry without causing inconsistency between the page table entry and the copy (or copies). Memory management unit 114 therefore waits until the latest lease expires (step 906). In some embodiments, the waiting includes determining that there is less than a threshold time left until the latest lease expires and then pausing the modification of the page table entry until the latest lease has expired. In some embodiments, memory management unit 114 may prevent other copies of the virtual address to physical address translation from being stored in TLBs while waiting to avoid waiting through one or more subsequent/newly acquired leases.

After waiting until the latest lease expires, memory management unit 114 modifies the page table entry (step 908). During this operation, memory management unit 114 updates the virtual address to physical address translation and/or the metadata for the page table entry.

When the latest lease has expired (step 904), and thus there are no valid (and thus usable) copies of the virtual address to physical address translation from the page table entry held in the TLB(s), memory management unit 114 can modify the page table entry without causing inconsistency. Memory management unit 114 therefore modifies the page table entry (step 908). Note that this modification is made without performing a TLB shootdown, as the latest lease value can be used to confirm that no copies of the virtual address to physical address translation are held in the TLBs.

Additional Operations Based on Lease Values and Latest Lease Values

As described above, the described embodiments can use lease values and latest lease values for avoiding TLB shootdowns. In addition, the described embodiments can use the lease values for other operations. For example, in some embodiments, a replacement policy for selecting TLB entries for eviction (i.e., to make space for new TLB entries) is augmented using lease values. In these embodiments, the augmentation includes using expired (or unexpired) leases as part of the replacement decision for TLB entries under the replacement policy. For example, TLB entries with expired leases may be preferentially selected for eviction and/or the expiration of leases may be used as a factor along with other replacement policy factors (e.g., least-recently used, least used, etc.) for selecting TLB entries for eviction. Generally, the described embodiments can use the lease values and/or the latest lease values when performing any type of operation for which TLB entries and/or the expiration thereof is of interest.

In some embodiments, a computing device (e.g., computing device 100 in FIG. 1 and/or some portion thereof) uses code and/or data stored on a non-transitory computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs).

In some embodiments, one or more hardware modules are configured to perform the operations herein described. For example, the hardware modules can comprise, but are not limited to, one or more processors/cores/central processing units (CPUs), application-specific integrated circuit (ASIC) chips, field-programmable gate arrays (FPGAs), caches/cache controllers, memory management units, compute units, embedded processors, graphics processors (GPUs)/graphics cores, pipelines, Accelerated Processing Units (APUs), and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., computing device 100 and/or some portion thereof) is stored on a non-transitory computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuits that perform the described operations. In some embodiments, the circuits in a functional block include circuits that execute program code (e.g., microcode, firmware, applications, etc.) to perform the described operations.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for handling entries in a translation lookaside buffer (TLB) in a computing device, the method comprising:
maintaining a lease value for an entry in the TLB, the lease value representing a time until a lease for the entry in the TLB expires, wherein the entry in the TLB is invalid when the associated lease has expired;
maintaining, for a page table entry in a page table that is associated with the entry in the TLB, a latest lease value, the latest lease value being an expiration time of a latest lease expiration for the entry in the TLB and an entry in another TLB in the computing device; and
using the lease value to control operations that are allowed to be performed using information from the entry in the TLB.

2. The method of claim 1, further comprising:
performing a page table walk to acquire a page table entry from a page table, the page table entry comprising a virtual address to physical address translation and metadata;
updating the entry in the TLB based on the virtual address to physical address translation and the metadata from the page table entry; and
updating the lease value for the entry in the TLB to a determined value.

3. The method of claim 2, further comprising, when updating the lease value for the entry in the TLB:
when the lease value exceeds the latest lease value for the page table entry in the page table, setting the latest lease value for the page table entry in the page table to a value representing the lease value.

4. The method of claim 3, further comprising:
determining that the page table entry in the page table is to be modified;
determining that the latest lease value for the page table entry has expired and therefore any entry in a TLB with information based on the page table entry is no longer valid; and
modifying the page table entry in the page table without performing a TLB shootdown, the TLB shootdown comprising causing other TLBs in the computing device to invalidate any cached copy of information based on the virtual address to physical address translation or the metadata from the page table entry.

5. The method of claim 4, wherein modifying the page table entry in the page table comprises modifying at least one of the virtual address to physical address translation or the metadata in the page table entry.

6. The method of claim 3, further comprising:
determining that the page table entry in the page table is to be modified;
determining that the latest lease value for the page table entry has not expired and therefore at least one TLB presently has a valid entry with information based on the page table entry;
performing a TLB shootdown; and
modifying the page table entry in the page table.

7. The method of claim 3, further comprising:
determining that the page table entry in the page table is to be modified;
determining that the latest lease value for the page table entry has not expired and therefore at least one TLB presently has a valid entry with information based on the page table entry; and
waiting for the passing of a time longer than the latest lease value so that any entry in a TLB with information based on the page table entry is no longer valid before modifying the page table entry in the page table.

8. The method of claim 2, wherein using the lease value to control operations that are allowed to be performed using information from the entry in the TLB comprises:
acquiring a virtual address to be translated into a physical address;
determining that the entry in the TLB includes a corresponding virtual address to physical address translation;
checking the lease value for the entry in the TLB to determine if the lease for the entry has expired;
when the lease has expired, not acquiring the virtual address to physical address translation or TLB entry metadata from the entry in the TLB, but instead performing a page table walk to acquire the virtual address to physical address translation or the metadata; and
when the lease has not expired, acquiring the virtual address to physical address translation or the TLB entry metadata from the entry in the TLB.

9. The method of claim 2, further comprising:
determining one or more runtime conditions; and
dynamically setting the determined value based on one or more runtime conditions.

10. The method of claim 9, wherein determining the runtime conditions comprises at least one of:
determining a rate at which hits occur for TLB entries with expired or unexpired leases; and
determining one or more changes in page properties.

11. The method of claim 2, wherein the determined value represents an absolute time or a relative time in a reduced form.

12. The method of claim 2, wherein the determined value is used for two or more entries in the TLB associated with corresponding page table entries for a region of a memory.

13. A computing device, comprising:
a processor comprising a core; and
a translation lookaside buffer (TLB) in the core;
wherein the processor is configured to:
maintain a lease value for an entry in the TLB, the lease value representing a time until a lease for the entry in the TLB expires, wherein the entry in the TLB is invalid when the associated lease has expired;
maintain, for a page table entry in a page table that is associated with the entry in the TLB, a latest lease value, the latest lease value being an expiration time of a latest lease expiration for the entry in the TLB and an entry in another TLB in the computing device; and use the lease value to control operations that are allowed to be performed using information from the entry in the TLB.

14. The computing device of claim 13, further comprising:

a memory, the memory storing a page table;

wherein the processor and the memory are configured to:

perform a page table walk to acquire a page table entry from the page table, the page table entry comprising a virtual address to physical address translation and metadata;

update the entry in the TLB based on the virtual address to physical address translation and the metadata from the page table entry; and update the lease value for the entry in the TLB to a determined value.

15. The computing device of claim 14, wherein, when updating the lease value for the entry in the TLB, the processor and the memory are further configured to:

when the lease value exceeds the latest lease value for the page table entry in the page table, set the latest lease value for the page table entry in the page table to a value representing the lease value.

16. The computing device of claim 15, wherein the processor and the memory are further configured to:

determine that the page table entry in the page table is to be modified;

determine that the latest lease value for the page table entry has expired and therefore any entry in a TLB with information based on the page table entry is no longer valid; and modify the page table entry in the page table without performing a TLB shootdown, the TLB shootdown comprising causing other TLBs in the computing device to invalidate cached copies of information based on the virtual address to physical address translation or the metadata from the page table entry.

17. The computing device of claim 16, wherein the processor and the memory are further configured to:

determine that the page table entry in the page table is to be modified;

determine that the latest lease value for the page table entry has not expired and therefore at least one TLB presently has a valid entry with information based on the page table entry;

perform a TLB shootdown; and modify the page table entry in the page table.

18. The computing device of claim 15, wherein the processor and the memory are further configured to:

determine that the page table entry in the page table is to be modified;

determine that the latest lease value for the page table entry has not expired and therefore at least one TLB presently has a valid entry with information based on the page table entry; and wait for the passing of a time longer than the latest lease value so that any entry in a TLB with information based on the page table entry is no longer valid before modifying the page table entry in the page table.

19. The computing device of claim 14, wherein, when using the lease value to control operations that are allowed to be performed using information from the entry in the TLB, the processor and the memory are further configured to:

acquire a virtual address to be translated into a physical address;

determine that the entry in the TLB includes a corresponding virtual address to physical address translation;

check the lease value for the entry in the TLB to determine if the lease for the entry has expired;

when the lease has expired, not acquire the virtual address to physical address translation or TLB entry metadata from the entry in the TLB, but instead perform a page table walk to acquire the virtual address to physical address translation or the metadata; and when the lease has not expired, acquire the virtual address to physical address translation or the TLB entry metadata from the entry in the TLB.

20. The computing device of claim 14, wherein the processor and the memory are further configured to:

determine one or more runtime conditions; and dynamically set the determined value based on one or more runtime conditions.

* * * * *